No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 3.

No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 5.

No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 6.

No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 7.

No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 8.

No. 725,203. PATENTED APR. 14, 1903.
L. W. BATES.
APPARATUS FOR FORMING NAVIGABLE CHANNELS.
APPLICATION FILED JULY 19, 1900.
NO MODEL. 9 SHEETS—SHEET 9.

WITNESSES
INVENTOR
Lindon W. Bates,
by Dodge and Sons,
Attorneys

UNITED STATES PATENT OFFICE.

LINDON WALLACE BATES, OF CHICAGO, ILLINOIS.

APPARATUS FOR FORMING NAVIGABLE CHANNELS.

SPECIFICATION forming part of Letters Patent No. 725,203, dated April 14, 1903.

Application filed July 19, 1900. Serial No. 24,249. (No model.)

*To all whom it may concern:*

Be it known that I, LINDON WALLACE BATES, a citizen of the United States, residing at Chicago, in the county of Cook and State of Illinois, have invented certain new and useful Improvements in Apparatus for Forming Navigable Channels, of which the following is a specification.

My present invention pertains to an improved apparatus for forming navigable channels across river-bars and the like, and will be best understood upon reference to the following drawings, wherein—

The object of my invention is to provide an improved apparatus for forming navigable channels across river-bars and the like, and this at a less cost than can be done by dredging or other methods of deepening now in vogue.

The invention is more especially applicable for use on crossover-bars—that is to say, bars formed between the bends of a river. By eroding the material forming the bar or deposit and at the same time agitating the water sufficiently to keep the eroded particles in suspension the transporting power or current of the river is brought into play and assists in carrying off the material thus held in suspension.

The plant in general consists of a number of pontoons which are flexibly connected with one another, and a single, double, or multiple line of such pontoons may be employed. Each pontoon is provided with a number of contrivances for rapidly eroding the bottom of the river, the contrivances being so arranged that they may be raised or lowered to suit the depth of water. The upstream end of the line or lines of pontoons, as the case may be, is attached to a tug adapted for working in shallow water, and a second tug of similar description may be attached to the downstream end of the pontoon-line, or this end may be controlled by two lines leading to anchors.

Figures 1, 2:
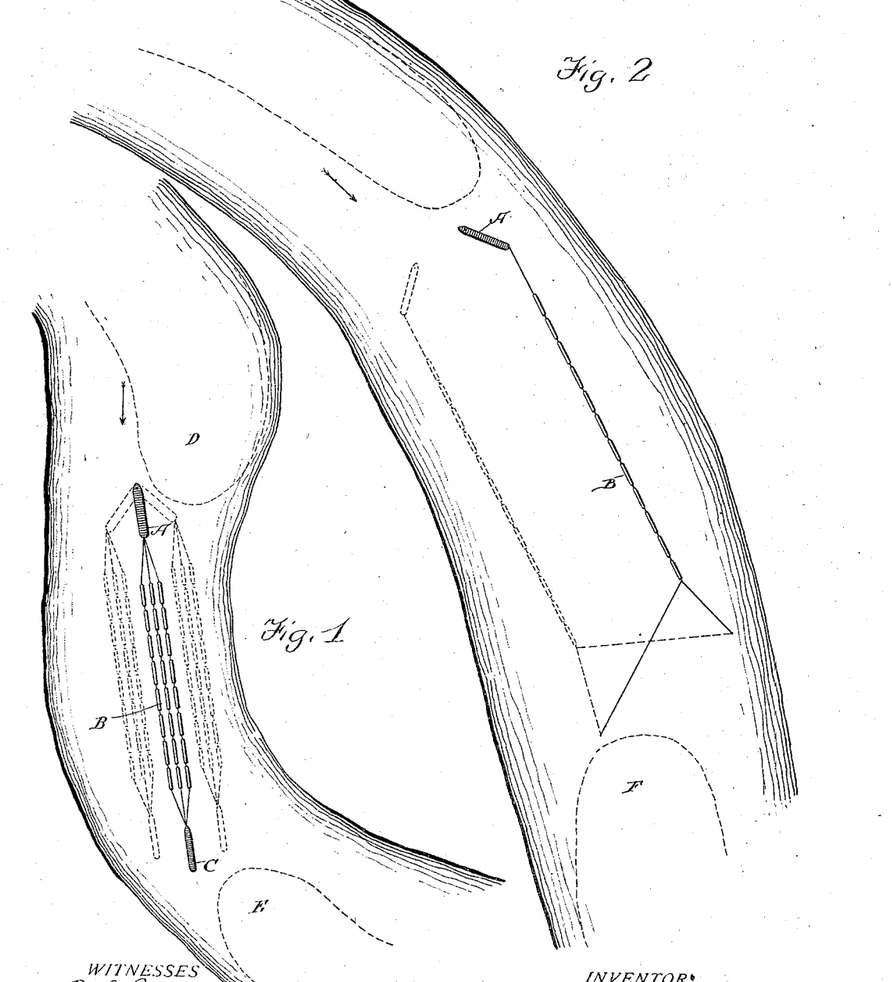
Figure 1 is a plan view illustrating one form of the apparatus or plant used in carrying out my invention.
Fig. 2, a similar view showing another form of the apparatus or plant.
Figure 3:
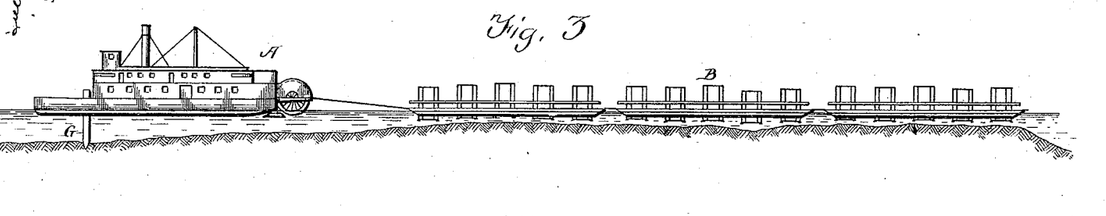
Fig. 3, a side elevation showing the relation of the apparatus to the bar which it is desired to remove.

In Fig. 1 there is illustrated a series of lines of flexibly-connected pontoons controlled by two tugs, one at each end of the line, while in Fig. 2 is shown a single line of pontoons controlled by a tug at the upstream end and by anchor-lines at the opposite or downstream end. The line of pontoons is towed into position over the bar to be attacked, and the eroding apparatus is set in motion after having been adjusted to the depth of water occurring at that spot, as is best illustrated in Fig. 3. The mechanism on the upstream-tug then proceeds to move the pontoon backward and forward a short distance—viz., about the distance from one pontoon to the other. A narrow trench or channel is soon formed in the bar, the eroding agents being lowered in the process until the required depth is reached over the whole length of line. As soon as the eroding devices begin to form a channel the current sets in through said channel and assists the eroding agents in their action. When the required depth of channel has been reached, the tug moves the line of pontoons to one side, the upstream position being fixed by the width of channel it is intended to produce. During this operation the pontoon-line is kept taut by the downstream-tug or else by paying out and hauling in the controlling-lines hereinbefore mentioned from a suitable hoisting or warping engine. The material removed by erosion is also kept in suspension by the action of the eroding apparatus, and the agitation produced thereby is sufficient to allow the river or current to carry off said eroded material to one side and into the deep pools which occur at the lower end of the bar.

It is manifest that the above description applies more particularly to a vertical-section eroding method or apparatus. The method may, however, be carried out by any apparatus designed to take off horizontal strata.

A great variety of eroding and agitating agents may be used, and a number of them are shown in the accompanying drawings.

Referring more particularly to Figs. 1 to 6, inclusive, for a general understanding of the plant as a whole and one form of the eroding and agitating devices, A denotes the upstream-tug, having secured to it a series of lines of flexibly-connected pontoons B, which in turn are attached to a downstream-tug C. The upstream-tug A is secured at the upper end of the bar near the deep pool D, while the downstream-tug C is in a position near deep pool E below the bar. Ordinarily these pools will be found adjacent a crossover-bar formed in the river.

Figure 4:
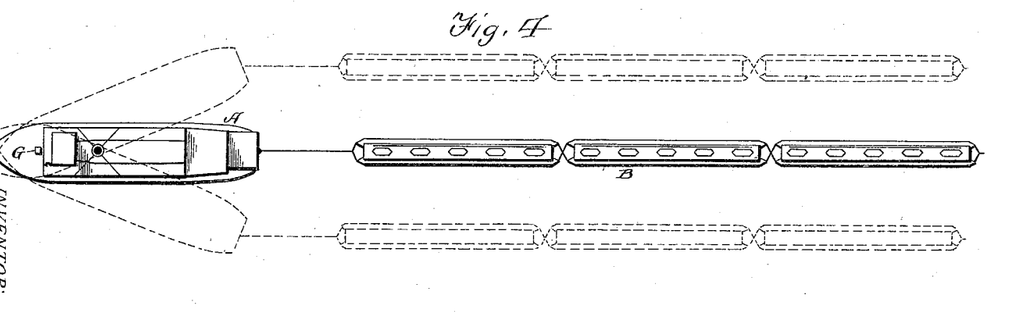
Fig. 4, a top plan view showing the different relative positions in which the apparatus may be placed.

In Fig. 2 the upstream-tug A is shown as having attached to it a single series of pontoons B, the lower or downstream end of which is connected to anchor-ropes F, which, as above stated, may be controlled by a suitable warping-engine. The upstream-tug A will preferably be held in its position by a spud G, which acts as a pivot therefor and permits the pontoon-lines to be thrown laterally across the bar, as is best indicated in Fig. 4, wherein three positions are shown. Each pontoon-section has mounted upon it some form of agitating apparatus, and one of the many forms which may be used is shown in detail in Figs. 5 and 6. In the form illustrated the agitating and eroding device is shown as a series of propellers H. These propellers in the construction shown are carried upon the lower ends of vertically-disposed shafts I, which pass through boxes or bearings J, secured upon framework or flooring K, which in turn is carried between two horizontally-disposed pontoon members L. A bevel-gear M is feathered or otherwise held in operative relation with shaft I, and said gear is, through gearing such as shown, connected to a line-shaft N, adapted to be driven by an electric motor O or other available source of power. Shaft N is designed to impart rotary motion to the various shafts I throughout the series mounted upon each pontoon. The vertically-disposed shafts I are preferably connected up in pairs to a suitable framework for properly supporting them and as affording means for raising and lowering the propellers to and from the bar upon which they are working. Said framework preferably consists of two cross members P, connected to the upper ends of the shafts, which in turn are rigidly connected, through uprights Q, to similar cross members R, which are attached to the lower ends of the shafts immediately above the propeller-guards S. The uprights Q pass through bearing blocks or members T, secured to the flooring or framework K. Cross-braces U may, if desired, be employed to stiffen the structure thus built up. To provide means for raising and lowering the frames, suitable winches V are secured to the flooring K, and ropes or cables passing therefrom about suitable pulleys are connected to the frame; but it is of course to be understood that any means may be employed for raising and lowering the frames and that any means may be used for imparting motion to the propellers. The employment of an electric motor, however, is advantageous, as it may be readily controlled from aboard the tug. Each pontoon-section is further fitted with two horizontal propellers X, one at each end, and placed so as to be just under water. These propellers may also be driven in any convenient manner, their object being to assist in keeping the line of pontoons straight when working on a bar and exposed to an oblique current. Any equivalent means, however, may be substituted for these.

Figure 5:
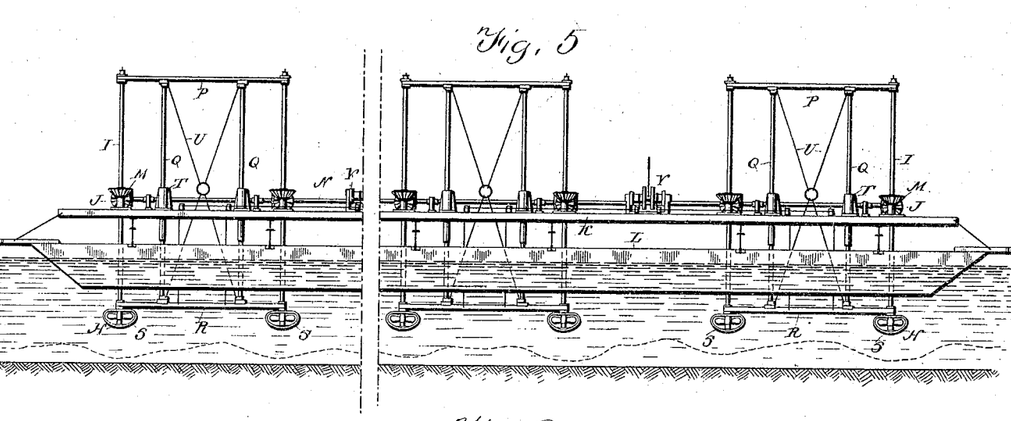
Fig. 5, an enlarged side elevation of one of the pontoon-sections, showing one form of eroding and agitating device carried thereby.
Figure 6:
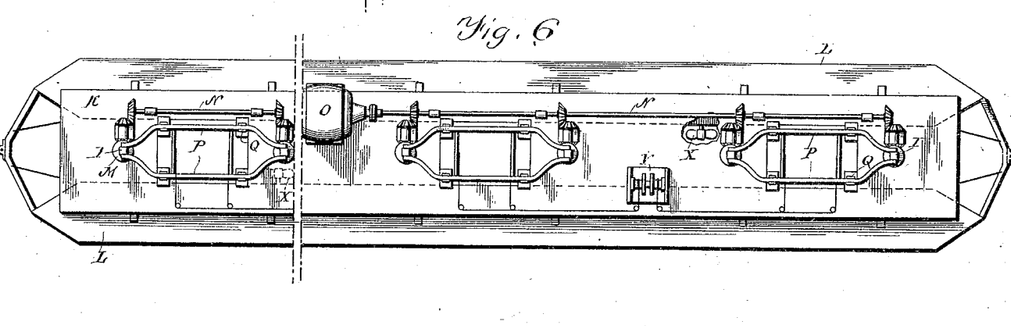
Fig. 6, a top plain view.

The action of the apparatus thus described is as follows: The pontoons are brought over the bar, and the frames carrying the propellers are lowered until the propellers are adjusted to the desired position over the bar. The line-shaft N is then thrown into action, imparting rotary motion to each of the propellers, which causes the water to act directly upon the material below, cutting it away and keeping the water in such a state of agitation that the material cannot again settle, but will be carried off by the current. As the material is eroded the pontoons are shifted longitudinally up and down stream and the propellers are lowered until the desired depth of cut is obtained. As soon as a channel is formed the current sets in therethrough and assists, as above noted, the apparatus in its action. When the cut has been made to the desired depth, the line of pontoons is shifted laterally, so as to bring the propellers over a new part of the bar.

There will now be described a number of modified forms of eroding and agitating devices which may be employed in lieu of those just described.

Figure 7:
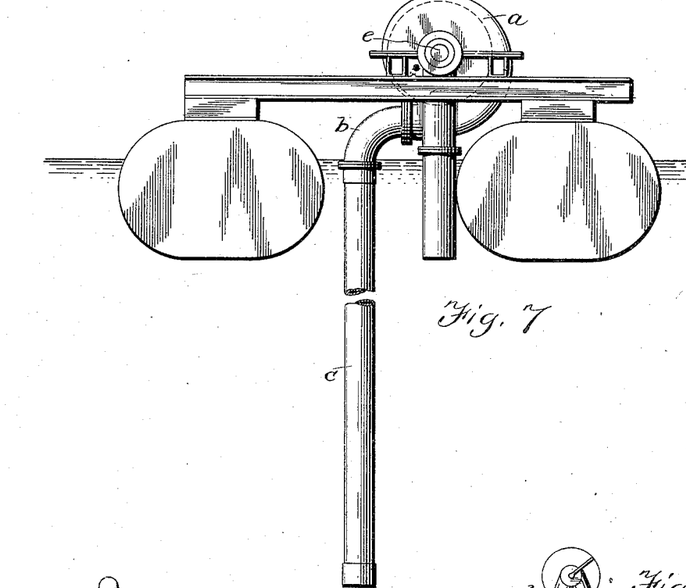
Figs. 7 to 19, inclusive, views illustrating various modified forms of eroding and agitating devices.
Figure 8:
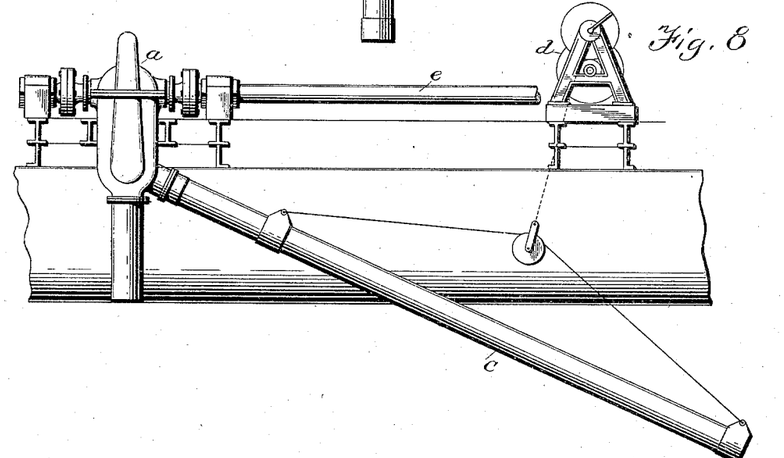

In Figs. 7 and 8 is shown one of a number of centrifugal pumps $a$, mounted on the pontoon-sections, the discharge or exit of which is connected by a swivel $b$ to a discharge-pipe $c$, from which the water is discharged under pressure or with considerable force. Said pipe may be raised or lowered by means of a winch $d$, mounted on the pontoon, to meet the varying depth of water in which the pipe works. The pumps may be driven by separate motors or from a line-shaft $e$.

Figure 9:
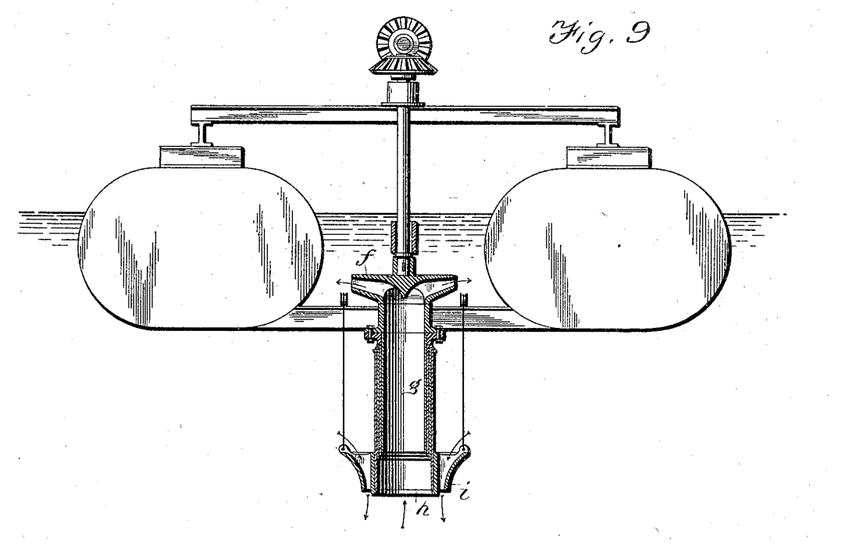
Figure 10:
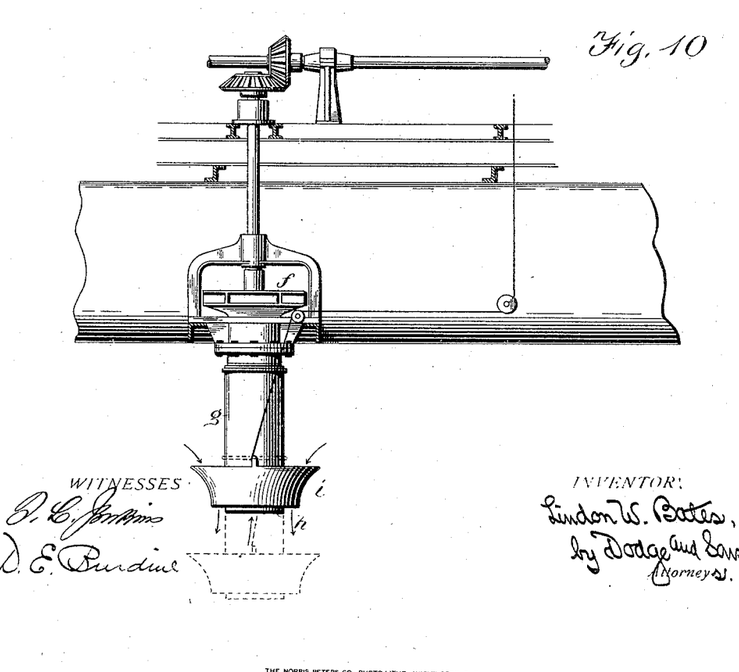

In Figs. 9 and 10 the employment of centrifugal pump-disks working under water is shown. The disk $f$ has connected to it a telescopic suction-pipe $g$, so that the mouthpiece $h$ may be raised or lowered, according to the depth of water in which the device is working. The current generated by the pump suction is directed on the surface of the bar by the conical nozzle $i$, surrounding the suction-orifice, through which the water drawn up by the pump has to be replaced. The surface of the bar is thereby eroded and the detached or eroded material drawn into the suction-pipe and discharged through the pump-disk in a state of suspension. The pumps may be driven by separate motors or from a line of shafting through gearing, as shown in the drawings, or in any convenient manner.

Figures 11, 12:
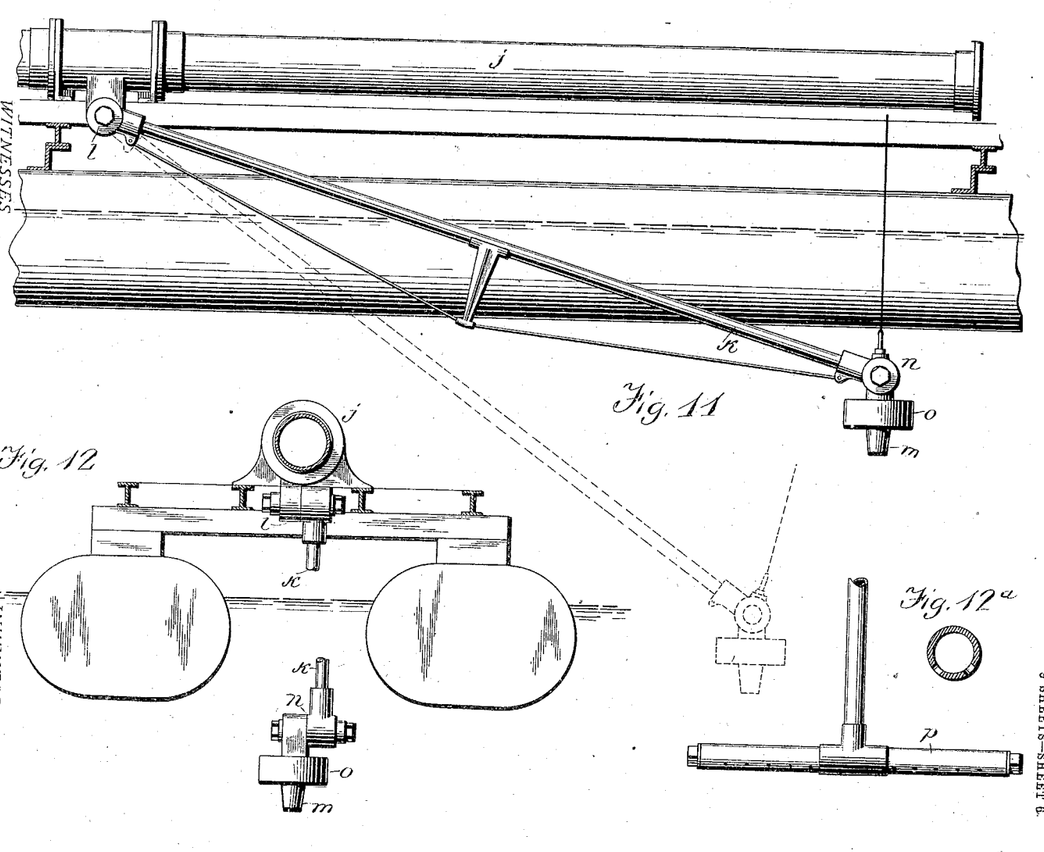

Figs. 11 and 12 show an arrangement in which erosion is produced by a number of water-jets supplied from a pressure water-main $j$, resting on the deck of a pontoon and connected to a suitable pump either on the pontoon or the tugboat. The discharge branches or pipes $k$ are connected to the main by means of swivel-joints $l$, and the discharge-nozzles $m$ are likewise connected to the lower end of the discharge-pipe $k$ by swivel-joints $n$. The nozzles $m$ are further provided with sinkers $o$, so that the axis of the nozzle is kept vertical and perpendicular to the surface of the bottom or bar. The pipe $k$ may be raised or lowered to suit the depth of water by means of a line and winch or in some other convenient manner. A transverse pipe $p$, Fig. 12$^a$, having a number of discharge-openings, may be substituted for the plain nozzle on each discharge-pipe.

Figures 13, 14:
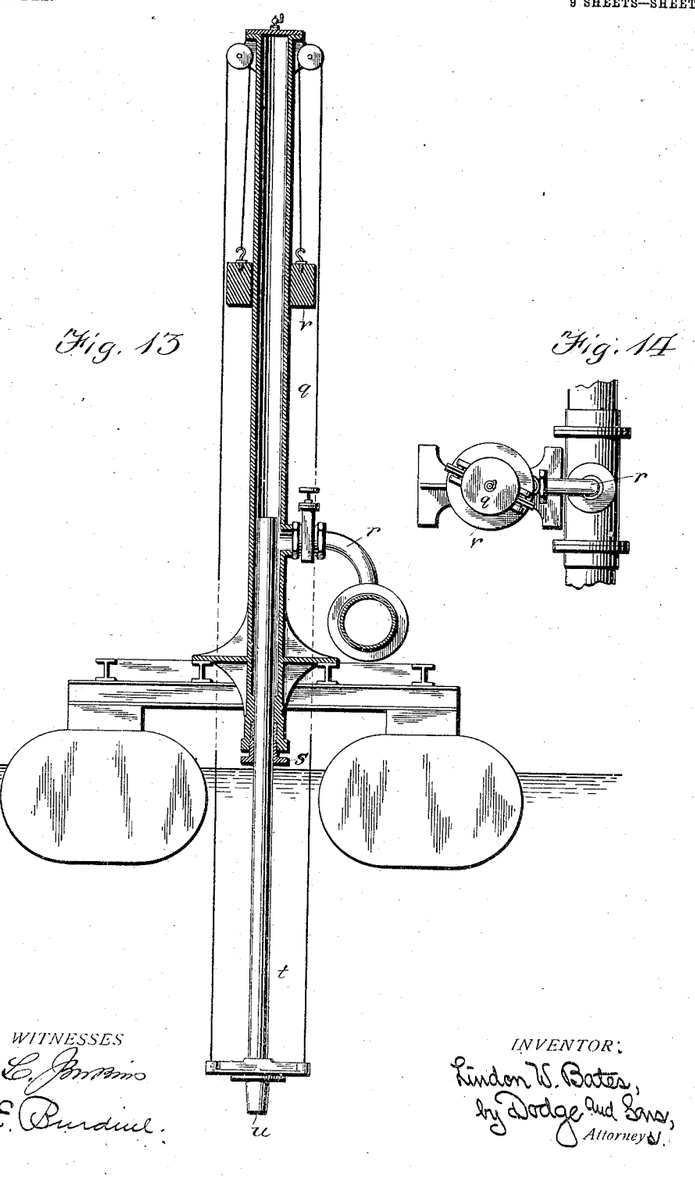

Figs. 13 and 14 show a further arrangement, in which water-jets supplied from a pressure-main are employed as eroding agents. The vertical adjustment is obtained in the following manner: A number of stand-pipes $q$, communicating with the main through branch pipes $r$, are secured to the deck of the pontoon and provided with stuffing-boxes $s$ at the lower end. A pipe $t$, having an outlet-nozzle or other discharging device $u$ at the lower end thereof, passes through the stuffing-box $s$ and may move up and down in the stand-pipe $q$. It is held in any position by a balance-weight $v$, traveling up and down on the outside of the stand-pipe, suitable lines passing over pulleys carried at the upper end of the stand-pipe forming connection between the pipe $t$ and the weight. A transverse pipe, such as is shown in Fig. 12$^a$, may be substituted for the nozzle $u$.

Figures 15, 16, 16A:
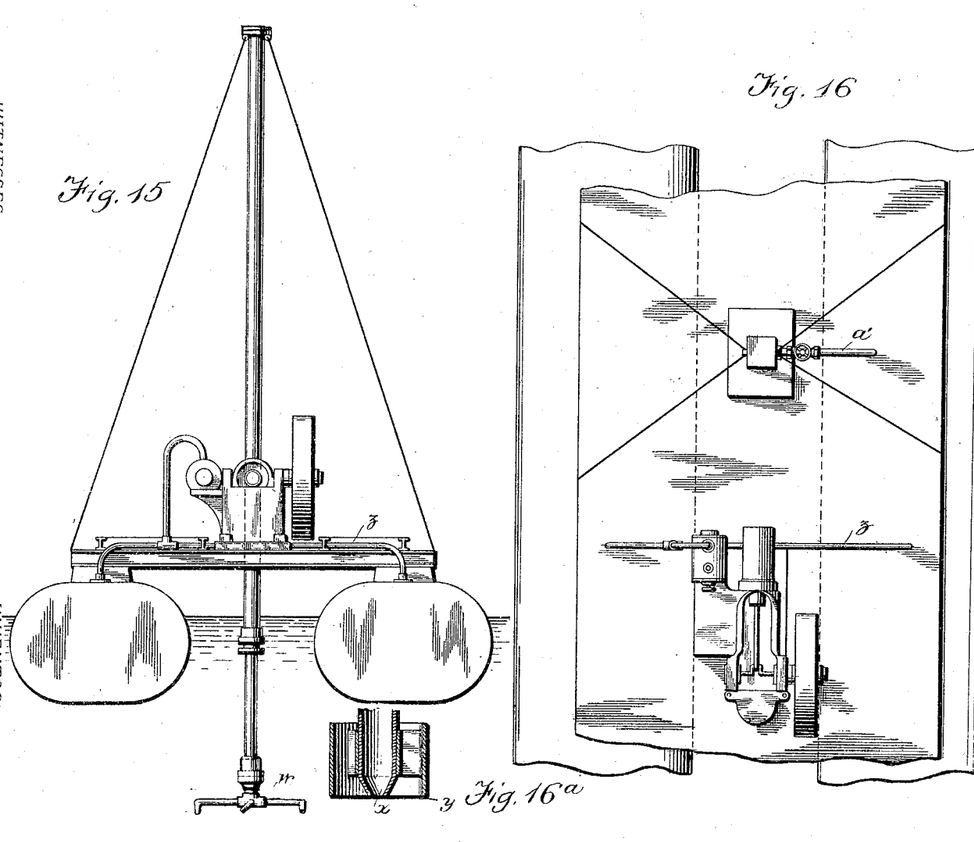

Instead of employing water compressed air may be discharged against the bar deposit from suitable nozzles, to which a vertical adjustment may be given by means similar to those illustrated in Figs. 11, 12, 13, and 14. Such an arrangement is shown in Figs. 15 and 16, where a vertical stand-pipe, with a second pipe sliding in it, is supplied with compressed air. The air may be discharged from a plain nozzle or, as shown in Fig. 15, from a reaction-wheel $w$, rotating under the influence of the escaping air, which assists in keeping the eroded material in suspension, or, if desired, a construction such as shown in Fig. 16$^a$ may be employed, wherein the air-discharge nozzle $x$ is surrounded by a concentric tube $y$, forming what may be termed an "ejector," whereby a body of water is set in motion. The suspension of the deposit in the water is materially assisted by the air-bubbles mixed with the water in all cases where compressed air is used. The compressed air may be supplied to the discharge-pipes from air-compressors mounted on the pontoons or from an air-compressor on the tugboat supplying the compressed-air main or from air-chambers formed in the floats of the pontoons and charged with compressed air by any of the foregoing arrangements or at intervals from compressors on shore.

Figs. 15 and 16 show an engine to which an air-compressing cylinder is coupled directly, pumping air into air-chambers in the floats through pipes $z$, the chambers in turn being connected with the stand-pipes through branch pipes $a'$.

Cutters or scrapers may be employed for excavating the material of the bar, the cutters or scrapers being of any shape suitable for the particular substance to be dealt with— viz., crown-cutters, face-cutters, or milling-cutters, either solid or hollow. These may be mounted on spindles permitting vertical adjustment and driven in any of the ways described in the case of the vertical propellers, Figs. 1 to 6. The eroding action of these cutters may be assisted and the material kept in suspension by combining with the cutting device any of the water or air jet devices already described.

Figures 17, 18, 19:
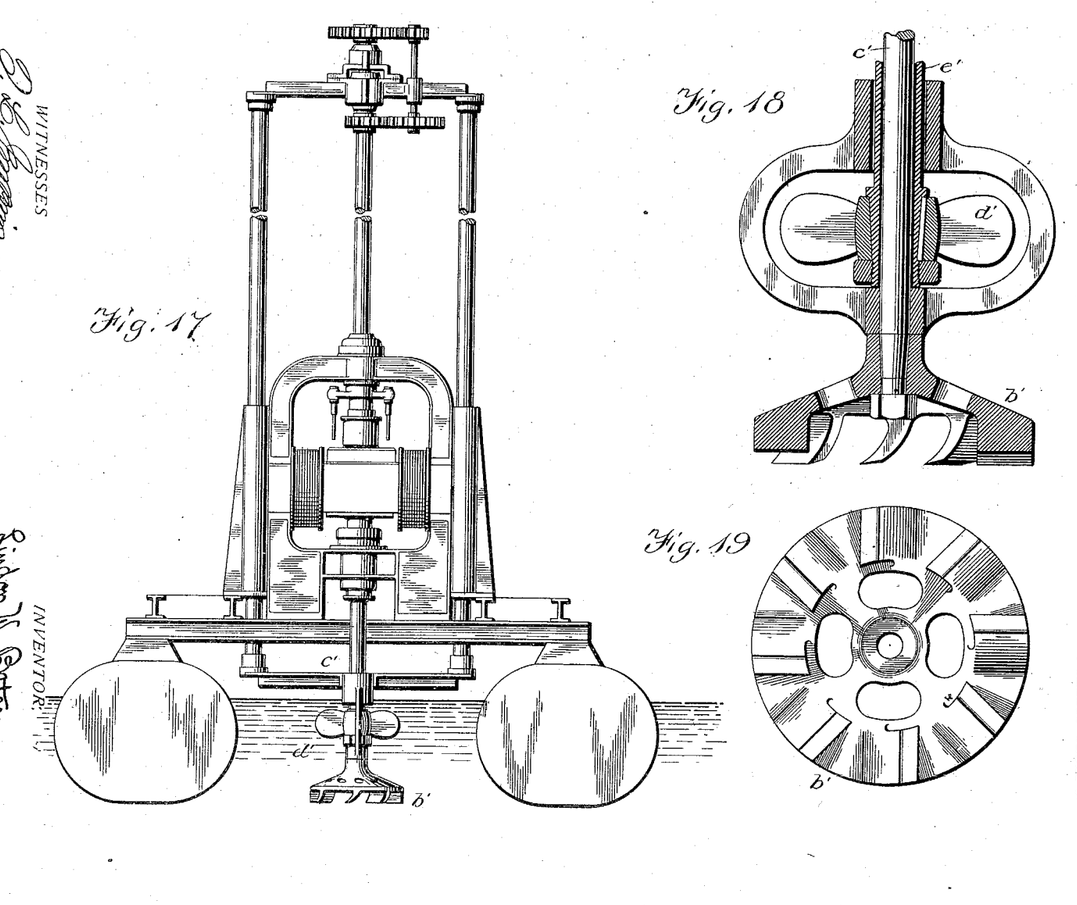

Figs. 17 and 18 show a face-cutter $b'$, mounted on a vertical spindle $c'$, which receives motion from an electric motor. The spindle is supported in a suitable framework similar to that used for the propeller-shafts, Figs. 5 and 6. A propeller $d'$ is mounted just above the cutter and also receives rotary motion from the electric motor. This propeller may direct a water-jet down on the working area of the cutter, or it may rotate in the opposite direction, so as to draw the water and loosen the material away from the cutter. The different speeds at which the cutter and propeller may rotate may be obtained in a variety of ways, the one adopted in the arrangement shown being as follows: The propeller $d'$ is mounted on a hollow spindle $e'$, which is driven by the motor. The spindle $c'$ passes through this hollow spindle and by means of gearing (shown in Fig. 17) receives rotary motion therefrom. The hollow spindle rotates at a high speed and drives the solid spindle, with its cutter $b'$, at a much-reduced speed.

With all the forms of devices referred to the parts may be raised and lowered to suit the varying depth of water over the bar. As the work progresses and the cuts become deeper these parts are lowered, so as to always keep in a proper working relation with reference to the surface of the bar, and, as set forth in connection with the apparatus shown in Fig. 6, they are designed to be traversed back and forth in the line of the cut. By so doing the depth of the cut is kept constant throughout its length. In all these cases a single row of eroding devices mounted on the longitudinal center line of the pontoon has been shown. It is obvious that two or more parallel rows of such devices may be provided and that they may be placed so as to work either in the space between the floats or so that a number may work in that space and a further number on the outside of the floats.

No claim is made herein to the method of deepening channels or removing bars, as said method forms the subject-matter of an application filed by me on or about the 19th day of July, 1900, Serial No. 24,248.

Having thus described my invention, what I claim is—

1. In an apparatus for forming channels in river-bars and the like, the combination of a line of flexibly-connected pontoons extending across substantially the entire width of the bar; means for reciprocating said pontoons across the surface of the bar and maintaining them in their various adjusted positions; and eroding devices for the surface of the bar carried by said pontoons.

2. In an apparatus for forming channels in river-bars and the like, the combination of a series of flexibly-connected pontoons extending across substantially the entire width of the bar; means for reciprocating said pontoons across the surface of the bar and maintaining them in their various adjusted positions; eroding devices carried by said pontoons; means for imparting motion to said eroding devices; and means for raising and lowering the same.

3. In an apparatus for forming channels in river-bars and the like, the combination of a series of flexibly-connected pontoons extending across substantially the entire width of the bar; means for reciprocating said pontoons across the surface of the bar and maintaining them in such adjusted positions; eroding devices carried by said pontoons; and means for independently adjusting the depth of said eroding devices.

4. In an apparatus for forming channels in river-bars and the like, the combination of a series of flexibly-connected pontoons; a tug connected to the forward end of said series; means for maintaining the opposite end of said series in its desired position over the bar; and eroding devices carried by said pontoons.

5. In an apparatus for forming channels in river-bars and the like, the combination of a series of flexibly-connected pontoons; a tug connected to one end of the series; means connected to the opposite end of the series for maintaining the pontoons in their desired positions; eroding devices carried by said pontoons; and propellers mounted on the pontoons for assisting in maintaining the proper positions of the pontoons.

6. In combination with a pontoon; eroding devices carried thereby; means for raising and lowering said eroding devices; and propellers carried by the pontoon.

7. In combination with a pontoon, eroding devices carried thereby; means for raising and lowering said eroding devices; means for securing a backward-and-forward motion of the pontoons; and means for shifting the pontoons laterally.

In testimony whereof I have signed my name to this specification in the presence of two subscribing witnesses.

LINDON WALLACE BATES.

Witnesses:
PERCY E. MATTOCKS,
EDMUND S. SNEWIN.